United States Patent [19]

George et al.

[11] Patent Number: 5,456,167
[45] Date of Patent: Oct. 10, 1995

[54] APPARATUS FOR CLEANING AND CRUSHING DRUMS

[76] Inventors: Brent C. George, 10 C Commons Way S., Portland, Tex. 78374; Bruce F. Rieck, 1609 Watchhill Rd., Austin, Tex. 78703; Kenneth Vairin, 103 S. Nursery Rd., Irving, Tex. 75060

[21] Appl. No.: 139,584

[22] Filed: Oct. 19, 1993

[51] Int. Cl.⁶ .................................................. B30B 9/00
[52] U.S. Cl. .................. 100/95; 100/100; 100/102; 100/131; 100/245; 100/215; 100/902; 134/62; 134/170; 141/89; 222/87; 414/412
[58] Field of Search ................ 134/62, 170; 100/95, 100/100, 102, 131, 240, 245, 246, 902, 94, 215; 141/89; 222/87; 414/412

[56] References Cited

U.S. PATENT DOCUMENTS

| | | | |
|---|---|---|---|
| 1,400,797 | 12/1921 | Burham | 134/170 X |
| 1,998,263 | 4/1935 | Townsend | 222/87 |
| 2,967,531 | 1/1961 | Nussbaum | 134/170 X |
| 3,073,325 | 1/1963 | Rebizzo et al. | 134/170 X |
| 3,664,355 | 5/1972 | Adams | 134/170 X |
| 3,739,471 | 6/1973 | Peres | 414/412 |
| 3,835,768 | 9/1974 | Kidson | 100/94 |
| 4,126,160 | 11/1978 | Gurtler | 100/902 |
| 4,133,340 | 1/1979 | Ballard | 134/170 X |
| 4,299,245 | 11/1981 | Clapper | 134/170 X |
| 4,396,340 | 8/1983 | Clinton | 414/412 |
| 4,735,368 | 4/1988 | Janko et al. | 414/412 |
| 5,174,344 | 12/1992 | Gonzalez-Miller et al. | 100/102 |

*Primary Examiner*—Stephen F. Gerrity

[57] ABSTRACT

An apparatus for sequentially removing the top, puncturing the sides, simultaneously washing the interior and exterior of a drum and crushing the drum.

4 Claims, 5 Drawing Sheets

5,456,167

APPARATUS FOR CLEANING AND CRUSHING DRUMS

BACKGROUND OF THE INVENTION

For various reasons, large quantities of hazardous chemicals are shipped and/or stored in 55 gallon drums as well as in drums of smaller sizes. Due to environmental concerns as well as government regulation, disposal of these drums when empty, or substantially empty, requires careful handling to dispose of the drum and its contents in a safe manner so as to prevent unnecessary exposure to or contamination by hazardous materials. Due to the obvious inconvenience of shipping and handling empty drums, it is preferable that the drums be cleaned and reduced in volume prior to being transported to a suitable disposal site from the location at which they are emptied of their commercial contents.

Frequently use of the drum contents occurs in remote locations which exacerbates the problem of cleaning and crushing the drums. Due to these circumstances, much of this work is done manually, or with various types of equipment, each requiring a separate power source and, in many instances, using equipment such as bulldozers or other heavy equipment not designed specifically for the task of crushing the drums.

Portable high pressure sprayers can be used for washing out drums, but these do not provide a uniform measure of performance nor means for containing the effluent produced by spraying and washing.

An object of the present invention is to provide a new and improved overall apparatus for cleaning and crushing large drums in which various steps can be performed mechanically and/or hydraulically with equipment designed for various specific tasks in the overall operation and which preferably share a single power source.

It is also an object of this invention to provide a means for draining drums and handling the drums once the top has been removed to provide a controlled high-pressure wash for both inside and outside the drums simultaneously.

A further object of the present invention is to provide a simple means for transferring the open drum to and from a spray wash booth to a drum crusher for crushing the drum.

An object of this invention is to provide a drum crusher which includes reinforcing means for aligning and guiding a movable platen so as to minimize racking forces in the crusher which impede efficient operation.

These and other objects will become apparent from the following specification which describes the invention as illustrated in the accompanying drawings wherein:

DESCRIPTION OF THE PREFERRED EMBODIMENT

Figure 1:
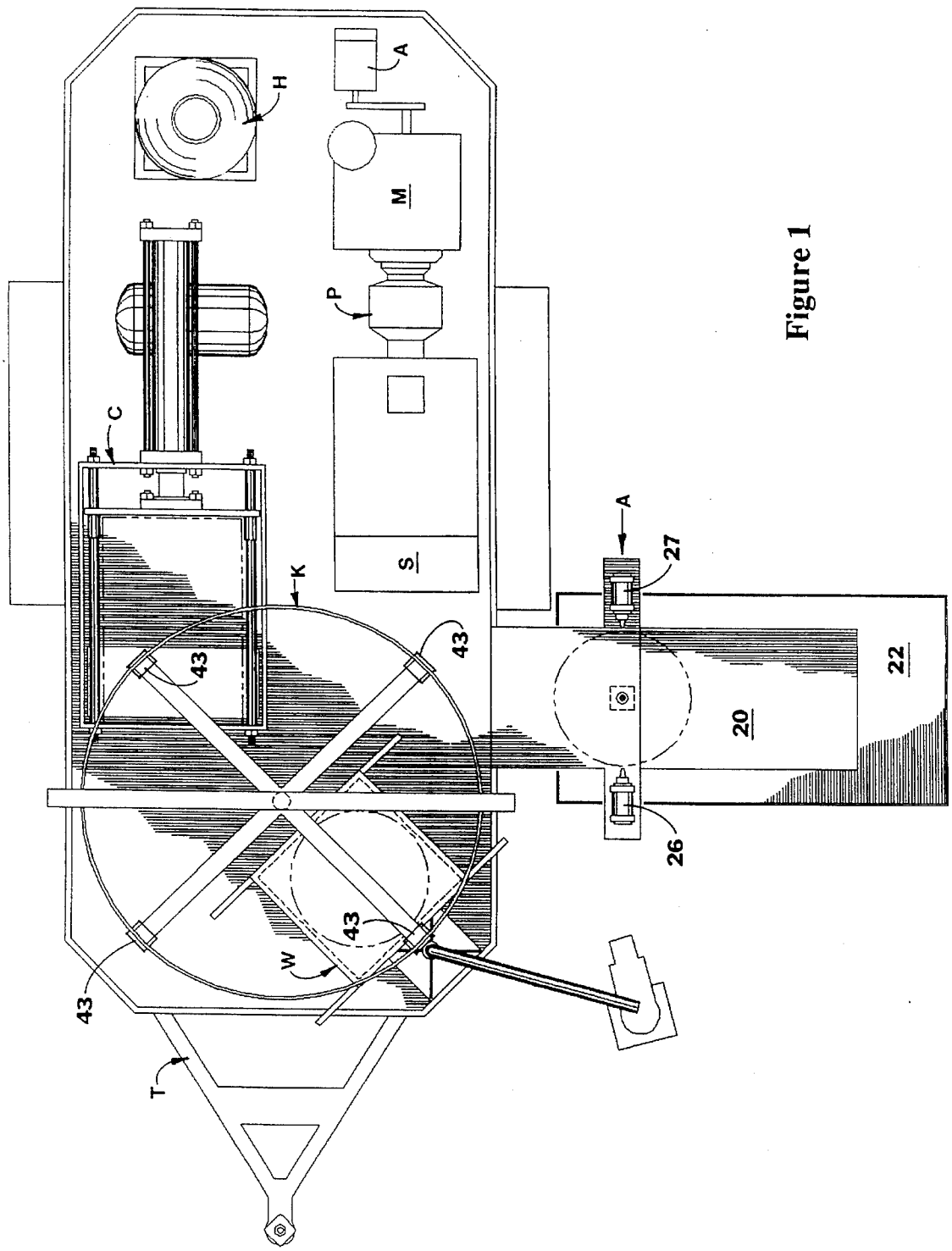
FIG. 1 is a plan view showing various components of the cleaning and crushing apparatus in a trailer-mounted mode.

The present invention provides a new and improved method and apparatus for sequentially opening, washing and crushing drums, such as 55 gallon drums, in which hazardous waste or industrial chemicals have been stored or shipped. The present apparatus is preferably mounted on a single trailer or truck bed for convenience and mobility. Also, the present apparatus is provided with a prime mover such as a diesel engine which powers an air compressor as well as electric and hydraulic systems for performing the various operations on the drums. As an alternative, the present apparatus is also equipped to operate off of plant, air, and/or electricity where available.

The trailer on which the equipment is mounted is provided with means for containing liquids which may spill from the drums being washed and cleaned, and such liquid can be contained so as to be directed to a desired location.

As shown in the drawings, a prime mover M is mounted on the trailer T on which the washing booth W is carried, along with a hot water heater H for supplying heated water to the spray booth, and a drum crusher C. A carousel K is also mounted on the trailer for lifting, moving, and supporting the drums as they are moved about between various stages in the cleaning and crushing operations.

The prime mover M is operably connected to an electric generator or alternator A for providing electric power to heat the water in the hot water heater H for washing the drums. Further, the prime mover M also drives a hydraulic pump P that powers a hydraulic cylinder that drives the movable platen for crushing the drums and also an air compressor for providing pressurized air for air operated components such as a drum head cutter and the work tool balance support all of which is described in more detail hereinafter. Also, there is included on the trailer T a separate manual pressure spray washer S to enable an operator to handle incidental spray cleaning from a common power source.

Figure 2:
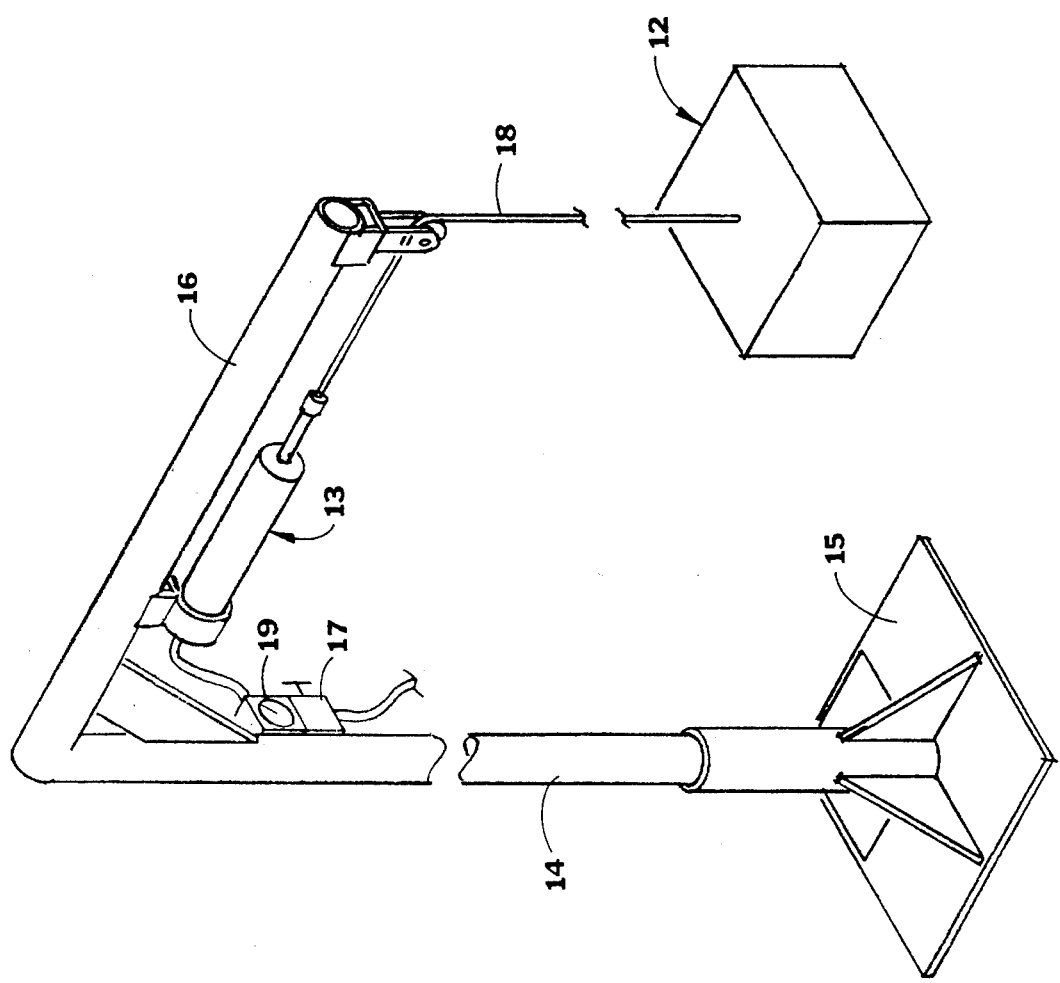
FIG. 2 is an isometric view showing an air balance means for supporting a work piece such as a drum head cutter.

As shown in FIG. 2, the drum head cutter, shown schematically and designated generally 10, is preferably air-operated, and is mounted on a special crane 12 that is positioned near the forward end of the trailer T. The crane includes a novel air-balance mechanism 13 that neutralizes or balances the weight of the drum head cutter so that it may be raised and/or lowered manually by an operator with a minimum of effort and suspended at the last elevation to which it was manually moved by the operator. The crane includes a mast 14 mounted on a stand 15 and a laterally extending boom 16. The cutter is suspended by a cable 18 connected to the air balance 13 mounted on the boom 16. The air balance mechanism includes an internal air cylinder with a movable piston therein with sufficient air pressure on the piston to counterbalance the weight of the drum head cutter 12. A manual control valve 17 and pressure gauge 19 are also provided so that the operator can adjust and set the pressure in the boom to balance the weight of the particular drum head cutter or other tool being used.

Figure 3:
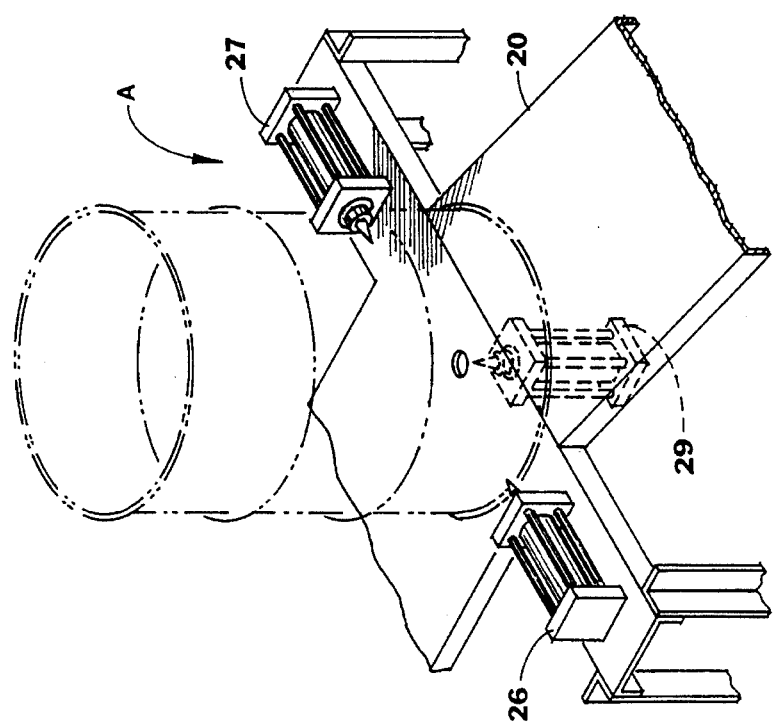
FIG. 3 is an isometric view showing means for piercing the sides and bottom of a drum.
Figure 4:
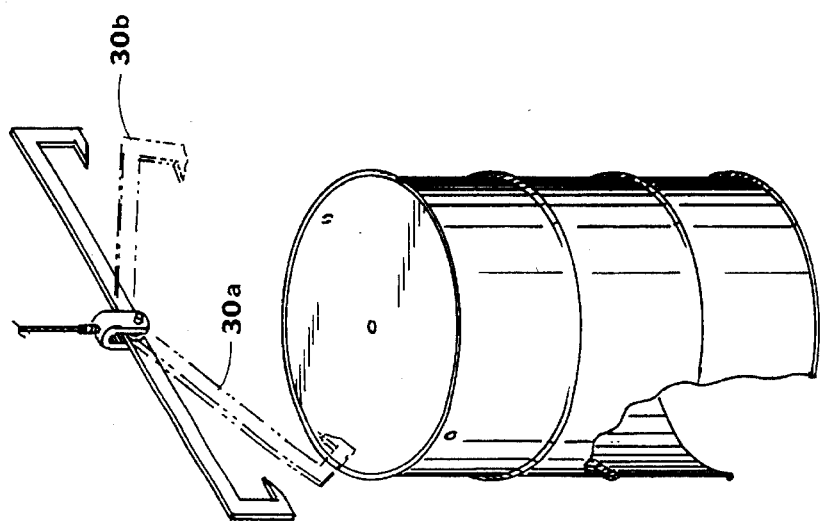
FIG. 4 is a view showing a tong-type handling apparatus for handling a drum.
Figure 5:
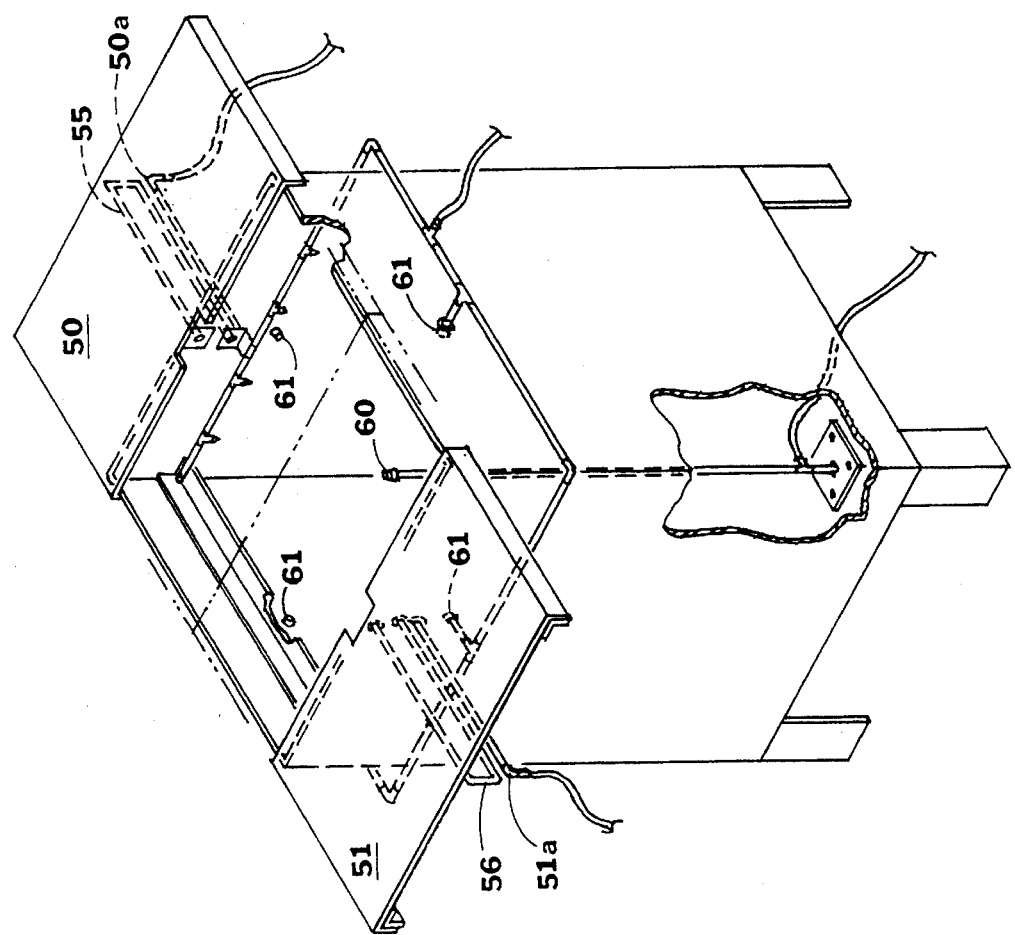
FIG. 5 is a cutaway isometric view showing a cabinet and apparatus for washing a drum.
Figure 6:
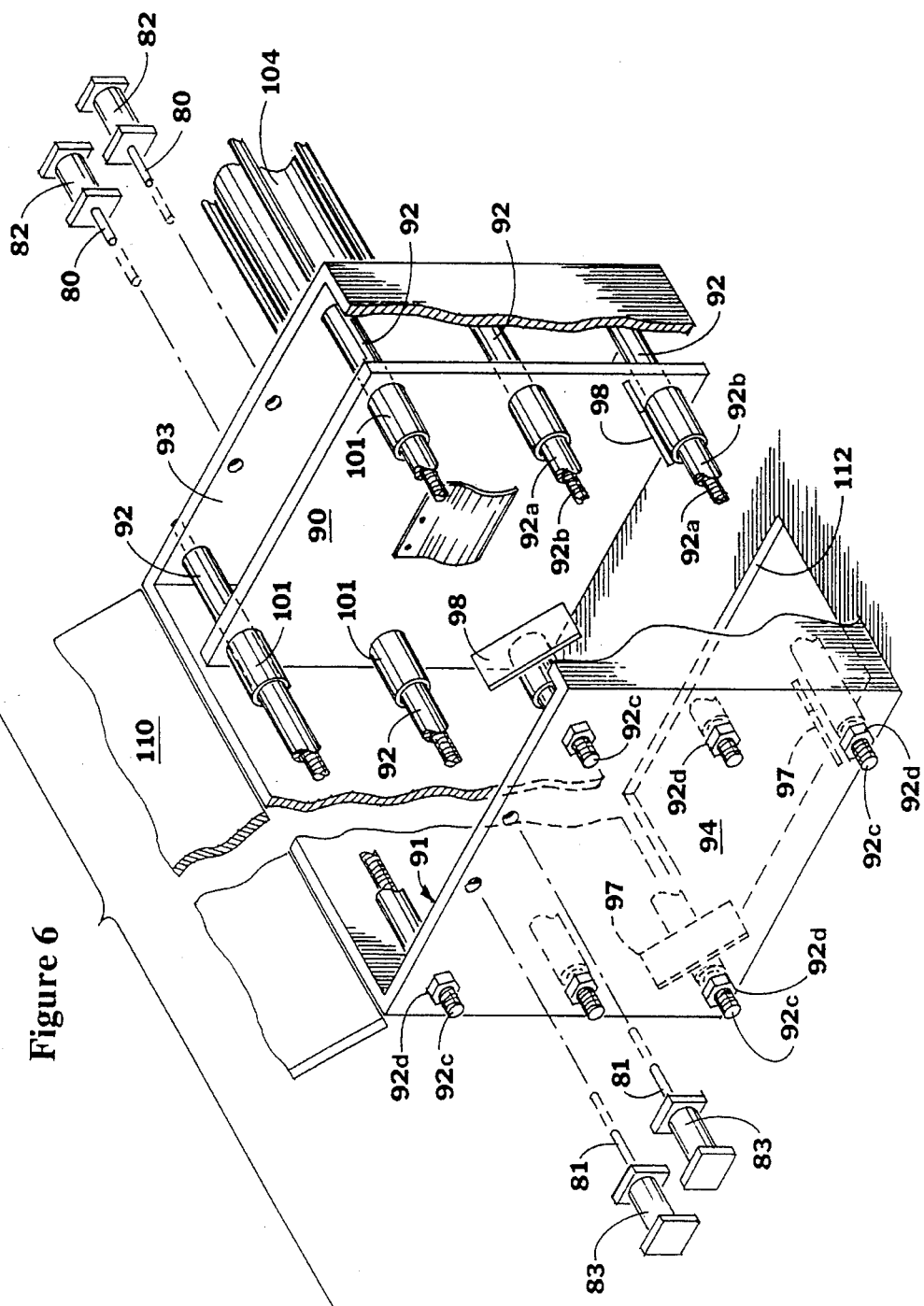
FIG. 6 is an exploded cutaway isometric view showing apparatus for crushing a drum.

As shown in FIGS. 1 and 3, a portable loading ramp 20 and tray 22 for containing spilled or drained contents from the drum are provided that may be positioned adjacent to the trailer to facilitate movement of the drums onto the trailer. With a drum positioned on the tray, the drum head cutter 12 is operated to cut and remove the head from the drum. The tray may include a rotatable base (not shown) for rotating the drum while the cutter is held stationary. If sufficient liquid is found in the drum, it can be removed by a liquid transfer pump that is carried on the trailer and transferred either to another container or to a suitable sump provided by the customer for removing and handling hazardous chemicals in situ.

Thereafter, the drum is moved up the loading ramp 20 to a position between the opposed drum piercing plungers 26 and 27 which are adapted to pierce the opposite sides of the drum near the bottom when activated. Also, there is provided a bottom piercing plunger 29 as well which is positioned between the side plungers and which is also actuated at the same time as the side plungers to pierce the bottom, and thus facilitate draining. The holes 33a and 33b pierced in opposite sides of the drum are used for receiving the lifting tongs which will be described hereinafter.

After piercing, the drum is turned upside down and a lifting yoke 30 is secured to the drum by means of bales 30a and 30b which are inserted into the pierced holes 33a and 33b in sides of the drum near the bottom 35. The lifting yoke 30 is suspended on a line or cable 40 carried by an air hoist 43 that is mounted on the carousel K that extends over or near the drum piercing apparatus and over or near the drum washing or spray booth W.

The drum is lifted by the air hoist 43 to an elevation above the top of the spray booth W and carried by the carousel K into position above the spray booth and then lowered into the spray booth by the air hoist. The carousel is provided with a plurality of air hoists, preferably four in number, to lift and lower drums for the washing and crushing operations. The carousel is controlled by a pneumatic indexer to exactly position the drums at various work stations on the trailer and to lock the carousel into position at each work station. With this arrangement, the drums are lifted and lowered to exactly the desired height at each station by the cable pneumatic cylinders.

The wash/spray booth W is provided with a pair of horizontally sliding top doors 50 and 51 that are air operated by air cylinders 50a and 51a to open and close by moving along tracks near the top of the booth. Associated with the sliding top doors are a pair of high pressure spray lances 55 and 56 with spray tips that spray downwardly into the booth and onto the upturned bottom and sides of the drum.

Also, the spray booth has a central upstanding spray head 60 for extending upwardly into an upturned drum for spraying high pressure water into the interior of the drum. Further, the spray booth has a series of spaced spray heads 61 on each side of the spray booth for simultaneously spray cleaning the exterior of the drum. The bottom of the spray booth has a perimeter wall for containing water used in spray washing. This wash water and any chemicals from the drum are collected and disposed of depending upon the circumstances of the site where the work is being done.

After the spray washing is complete, the top sliding doors 50 and 51 are withdrawn to enable the drum to be lifted by the bales 30a and 30b carried by the air hoist on the carousel. The empty drum is then transported out of the spray booth over to the open top of the drum crusher. The drum is lowered onto its side on sets of pairs of temporary support pins 80 and 81 at the top of the drum crusher C. With the drum on its side in this position, when the support pins are retracted by activating air rams 82 and 83; the drum will drop on its side onto support and alignment plates 97 and 98 mounted in the crusher on the movable and fixed platens, 90 and 91, respectively.

The movable platen 90 is slidably mounted on a plurality of parallel guide bars 92 that extend through the crusher from the front 93 to the rear fixed platen 94. The movable platen is preferably mounted on four slidable sleeves 101 that are carried on the four fixed rigid guides 92. Each guide comprises a hollow tubular member 92a through which a solid rod or bar 92b extends. Each rod 92b has threaded ends 92c on which nuts 92d are secured to afford a means for rigidly fixing both the front and the rear of the drum crusher to prevent twisting or racking from the pressures exerted during the crushing of a drum. To this end, the rods 92b are substantially the same o.d. as the i.d. of the guide tubes 92a and the front end of the crusher 93 is preferably fabricated from a heavy steel plate as well as the heavy steel plate 94 fixed at the rear end of the crusher against which the drum is crushed when the movable platen 100 is slid along the guide bars 92. The movable platen 100 or crusher is moved by the hydraulic ram 104 from a retracted position adjacent the front 93 of the crusher to an extended position near the fixed platen at the rear end of the crusher 94.

The hydraulic ram 104 is mounted on the front end 93 of the crusher and a movable piston in the hydraulic ram is affixed to the movable platen 90. With the movable platen in the withdrawn position adjacent the front end of the crusher, the drum is dropped onto the crusher alignment support plates 97 and 98, which support the drum on its side during the crushing operation.

With the drum thus aligned and supported, the top 110 of the crusher is closed and the hydraulic ram is actuated to move the platen 90 along the guide bars 92 and crush the drum. Once crushed, the hydraulic ram is reversed and the movable platen 90 is retracted toward the front 93. A leaf spring 90a is mounted on the face of the platen 90 for ejecting the drum by moving it away from the platen when the platen begins to be retracted toward the front of the crusher 93. There is an opening 112 provided in the bottom of the drum crusher through which the crushed drum drops to exit the crusher.

With this apparatus it would be appreciated that a small crew can quickly and easily open, clean and crush a number of drums at a much improved rate of production as the same crew would achieve were it using the various tools and apparatus and manually handling the drums at every stage of the cleaning and crushing operation.

Those skilled in the art will recognize that various modifications of the drum washing and crushing apparatus heretofore described have the unique advantage of permitting the rapid and efficient washing and crushing of drums at remote locations or in a plant facility.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed:

1. A drum cleaning and crushing apparatus comprising:

(a) draining means for receiving a drum in a draining position and for piercing the drum to allow any liquids remaining in the drum to drain out;

(b) a drum cleaning device having an enclosure for receiving and surrounding the drum, top opening means for opening a top of the enclosure to enable the drum to be placed in, and removed from, the enclosure and for closing the top of the enclosure, and wash means in the enclosure including a centrally disposed wash pipe, movable wash lances adapted to move over the top of an overturned drum in the enclosure, and perimeter spray jets for spraying lateral outer sides of the drum in the enclosure;

(c) drum crushing means for receiving the drum and for crushing the received drum to a compact size; and (d) drum transport means disposed adjacent to the draining means, drum cleaning device, and drum crushing means for transporting the drum from the draining means to a received position within the enclosure of the drum cleaning device and then from the drum cleaning device to the drum crushing means.

2. The apparatus of claim 1 wherein the draining means, drum cleaning device, drum crushing means, and drum transport means are each mounted on a moveable trailer.

3. The apparatus of claim 1 wherein the drum transport means includes:

(a) a carrousel structure;

(b) a boom mounted on the carrousel structure, the boom adapted to move to a position above the draining means, a position above the drum cleaning device, and to a position above the drum crushing means;

(c) a hoist mounted on the boom for raising and lowering the drum.

4. The apparatus of claim 1 wherein the drum crushing means includes:

(a) a crusher housing;

(b) a top opening in the crusher housing through which a drum may be received in the crusher housing;

(c) a hydraulic ram driven platen mounted within the crusher housing; and (d) a bottom opening in the crusher housing through which a drum may exit the crusher housing after being crushed to a compact size.

\* \* \* \* \*